(12) United States Patent
Roberge et al.

(10) Patent No.: US 10,125,724 B2
(45) Date of Patent: Nov. 13, 2018

(54) START SYSTEM FOR GAS TURBINE ENGINES

(75) Inventors: Gary D. Roberge, Tolland, CT (US); Andrew P. Berryann, Coventry, CT (US); Scott A. Carr, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1429 days.

(21) Appl. No.: 13/352,296

(22) Filed: Jan. 17, 2012

(65) Prior Publication Data

US 2013/0183136 A1   Jul. 18, 2013

(51) Int. Cl.
| | |
|---|---|
| F02K 3/075 | (2006.01) |
| F01D 19/00 | (2006.01) |
| F01D 9/06 | (2006.01) |
| F04D 29/52 | (2006.01) |
| F01D 9/04 | (2006.01) |
| F04D 27/00 | (2006.01) |
| F01D 17/00 | (2006.01) |
| F01D 1/02 | (2006.01) |

(52) U.S. Cl.
CPC .............. *F02K 3/075* (2013.01); *F01D 1/023* (2013.01); *F01D 9/04* (2013.01); *F01D 9/065* (2013.01); *F01D 17/00* (2013.01); *F01D 19/00* (2013.01); *F04D 27/002* (2013.01); *F04D 27/009* (2013.01); *F04D 29/524* (2013.01); *F05D 2220/323* (2013.01); *F05D 2240/12* (2013.01); *F05D 2250/35* (2013.01); *F05D 2250/411* (2013.01); *F05D 2250/90* (2013.01); *Y02T 50/671* (2013.01)

(58) Field of Classification Search
CPC .......... F01D 1/02; F01D 17/141; F02C 7/057; F02K 3/075
See application file for complete search history.

(56) References Cited

U.S. PATENT DOCUMENTS

| | | | |
|---|---|---|---|
| 3,287,906 A | 11/1966 | McCormick | |
| 3,552,873 A * | 1/1971 | Ghougasian | ..................... 415/49 |
| 3,754,484 A | 8/1973 | Roberts | |
| 3,892,358 A | 7/1975 | Gisslen | |
| 4,060,981 A * | 12/1977 | Hampton | ..................... 60/226.3 |
| 4,130,872 A | 12/1978 | Harloff | |
| 4,175,384 A | 11/1979 | Faust et al. | |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Conference on Engineering and Physics: Synergy for Success 2006. Journal of Physics: Conference Series vol. 105. London, UK. Oct. 5, 2006.

(Continued)

*Primary Examiner* — Dwayne J White
*Assistant Examiner* — Adam W Brown
(74) *Attorney, Agent, or Firm* — Carlson, Gaskey & Olds, P.C.

(57) ABSTRACT

A gas turbine engine includes a flow control mechanism operable to direct at least a portion of a fan airflow from a secondary flow path into a core flow path.

20 Claims, 13 Drawing Sheets

(56) References Cited

U.S. PATENT DOCUMENTS

| | | | |
|---|---|---|---|
| 4,275,560 A | | 6/1981 | Wright et al. |
| 5,136,837 A | | 8/1992 | Davison |
| 5,184,461 A | | 2/1993 | Stransky et al. |
| 5,433,674 A | | 7/1995 | Sheridan et al. |
| 5,447,411 A | | 9/1995 | Curley et al. |
| 5,454,225 A | * | 10/1995 | Sumser et al. ............... 60/602 |
| 5,524,847 A | | 6/1996 | Brodell et al. |
| 5,778,659 A | | 7/1998 | Duesler et al. |
| 5,809,772 A | | 9/1998 | Giffin, III et al. |
| 5,857,836 A | | 1/1999 | Stickler et al. |
| 5,915,917 A | | 6/1999 | Eveker et al. |
| 5,975,841 A | | 11/1999 | Lindemuth et al. |
| 6,223,616 B1 | | 5/2001 | Sheridan |
| 6,318,070 B1 | | 11/2001 | Rey et al. |
| 6,503,052 B1 | * | 1/2003 | Caillet ...................... 415/159 |
| 6,814,541 B2 | | 11/2004 | Evans et al. |
| 6,968,701 B2 | | 11/2005 | Glahn et al. |
| 7,021,042 B2 | | 4/2006 | Law |
| 7,101,146 B2 | * | 9/2006 | Coull et al. ................. 415/127 |
| 7,448,199 B2 | * | 11/2008 | Johnson ............... F01D 15/10 |
| | | | 239/265.17 |
| 7,481,062 B2 | | 1/2009 | Gaines et al. |
| 7,514,810 B2 | * | 4/2009 | Kern et al. ..................... 290/52 |
| 7,591,754 B2 | | 9/2009 | Duong et al. |
| 7,730,714 B2 | * | 6/2010 | Wood ................... F01D 17/162 |
| | | | 60/226.1 |
| 7,824,305 B2 | | 11/2010 | Duong et al. |
| 7,878,005 B2 | | 2/2011 | Bradbrook et al. |
| 7,882,691 B2 | | 2/2011 | Lemmers, Jr. et al. |
| 7,926,260 B2 | | 4/2011 | Sheridan et al. |
| 7,942,079 B2 | | 5/2011 | Russ |
| 7,997,085 B2 | | 8/2011 | Moniz et al. |
| 8,205,432 B2 | | 6/2012 | Sheridan |
| 2001/0010798 A1 | * | 8/2001 | Dailey et al. ................ 415/159 |
| 2005/0129501 A1 | * | 6/2005 | Coull et al. ..................... 415/1 |
| 2006/0288686 A1 | * | 12/2006 | Cherry et al. .............. 60/226.1 |
| 2007/0265761 A1 | * | 11/2007 | Dooley et al. ............... 701/100 |
| 2009/0188334 A1 | * | 7/2009 | Merry et al. ................. 74/15.2 |
| 2009/0288421 A1 | | 11/2009 | Zeiner et al. |
| 2010/0148396 A1 | | 6/2010 | Xie et al. |
| 2010/0154384 A1 | | 6/2010 | Schilling |
| 2010/0294597 A1 | * | 11/2010 | Parnin ........................... 184/6.1 |
| 2010/0331139 A1 | | 12/2010 | McCune |
| 2011/0041511 A1 | | 2/2011 | Bradbrook et al. |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

(56) References Cited

OTHER PUBLICATIONS

Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M.T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
European Search Report for European Patent Application No. 13151205 dated Oct. 14, 2016.

\* cited by examiner

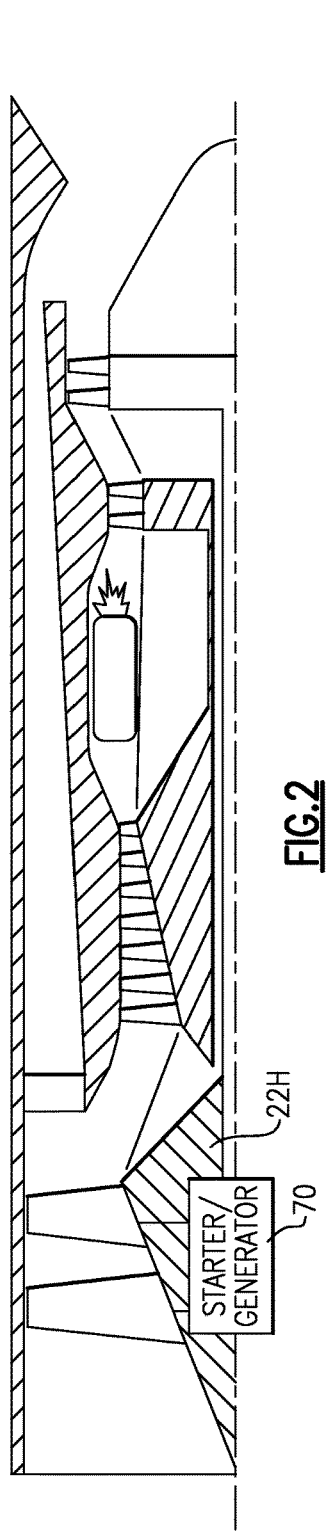
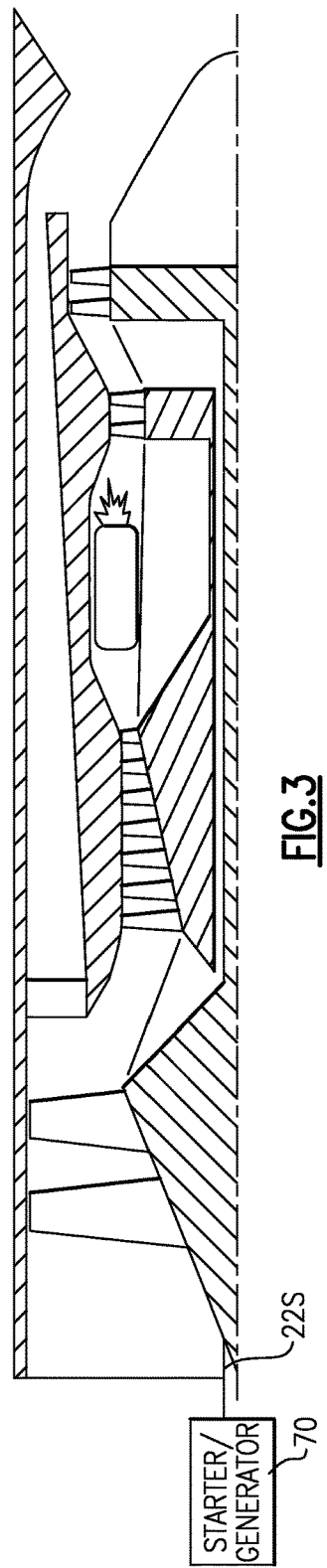

START SYSTEM FOR GAS TURBINE ENGINES

BACKGROUND

The present disclosure relates to gas turbine engines, and more particularly to a start system and method therefor.

Gas turbine engines are typically started through the high spool with an air turbine starter or electric starter/generator which drives a towershaft through a gearbox. In flight, accessories and the generator are driven from this high-spool-mounted gearbox. In such an arrangement, horsepower is extracted from the high spool, which may debit high compressor stability. Thus, one challenge in start systems for gas turbine engines concerns the design of an operable system, within the available space in the gas turbine engine, to improve compressor stability.

SUMMARY

A gas turbine engine according to an exemplary aspect of the present disclosure includes a high spool along an engine axis, the high spool operable to communicate a core airflow through a core flow path. A fan section is operable to communicate an airflow into a secondary flow path and the core flow path. A low spool is located along the engine axis to drive the fan section. A flow control mechanism is operable to direct at least a portion of the airflow from the secondary flow path into the core flow path.

In a further embodiment of the foregoing gas turbine engine, the flow control mechanism is movable between an open position and a closed position.

In a further embodiment of the foregoing gas turbine engine, the flow control mechanism is a fan duct blocker ring.

In a further embodiment of the foregoing gas turbine engine, the flow control mechanism is a nozzle.

A further embodiment of the foregoing gas turbine engine includes a starter/generator connected to the low spool.

In a further embodiment of the foregoing gas turbine engine, the starter/generator is forward of the low spool.

In a further embodiment of the foregoing gas turbine engine, the starter/generator is aft of the low spool.

In a further embodiment of the foregoing gas turbine engine, the starter/generator is driven by the low spool through a towershaft.

In a further embodiment of the foregoing gas turbine engine, the high spool along the engine axis with a high pressure compressor section and a high pressure turbine section, the high pressure compressor section includes a variable guide vane.

In a further embodiment of the foregoing gas turbine engine, the high spool along the engine axis with a high pressure compressor section and a high pressure turbine section, the high pressure turbine section includes a variable guide vane.

In a further embodiment of the foregoing gas turbine engine, the fan section includes a variable pitch fan blade.

In a further embodiment of the foregoing gas turbine engine, the fan section includes a variable pitch vane.

In a further embodiment of the foregoing gas turbine engine, the high spool along the engine axis with a high pressure compressor section and a high pressure turbine section, a start bleed in selective communication with the high pressure compressor section.

In a further embodiment of the foregoing gas turbine engine, the low spool drives the fan section through a geared architecture.

A method of operating a gas turbine engine gas turbine engine according to a further exemplary aspect of the present disclosure includes driving a low spool to generate a fan airflow from a fan section connected to the low spool and modulating a flow control mechanism to direct at least a portion of the fan airflow from a secondary flow path into a core flow path to drive a high spool.

In a further embodiment of the foregoing method, no accessory gearbox is driven by the high spool.

A further embodiment of the foregoing method includes rotating the high spool in a direction opposite that of the low spool.

A further embodiment of the foregoing method includes driving the fan section through a geared architecture driven by the low spool.

A further embodiment of the foregoing method includes driving the low spool with a starter/generator.

A further embodiment of the foregoing method includes driving a constant speed transmission with the low spool.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a general schematic view of an exemplary gas turbine engine with a low spool driven starter generator located within a fan hub according to another disclosed non-limiting embodiment;

FIG. 3 is a general schematic view of an exemplary gas turbine engine with a low spool driven starter generator driven by a low spool forward shaft according to another disclosed non-limiting embodiment;

DETAILED DESCRIPTION

Figure 1:
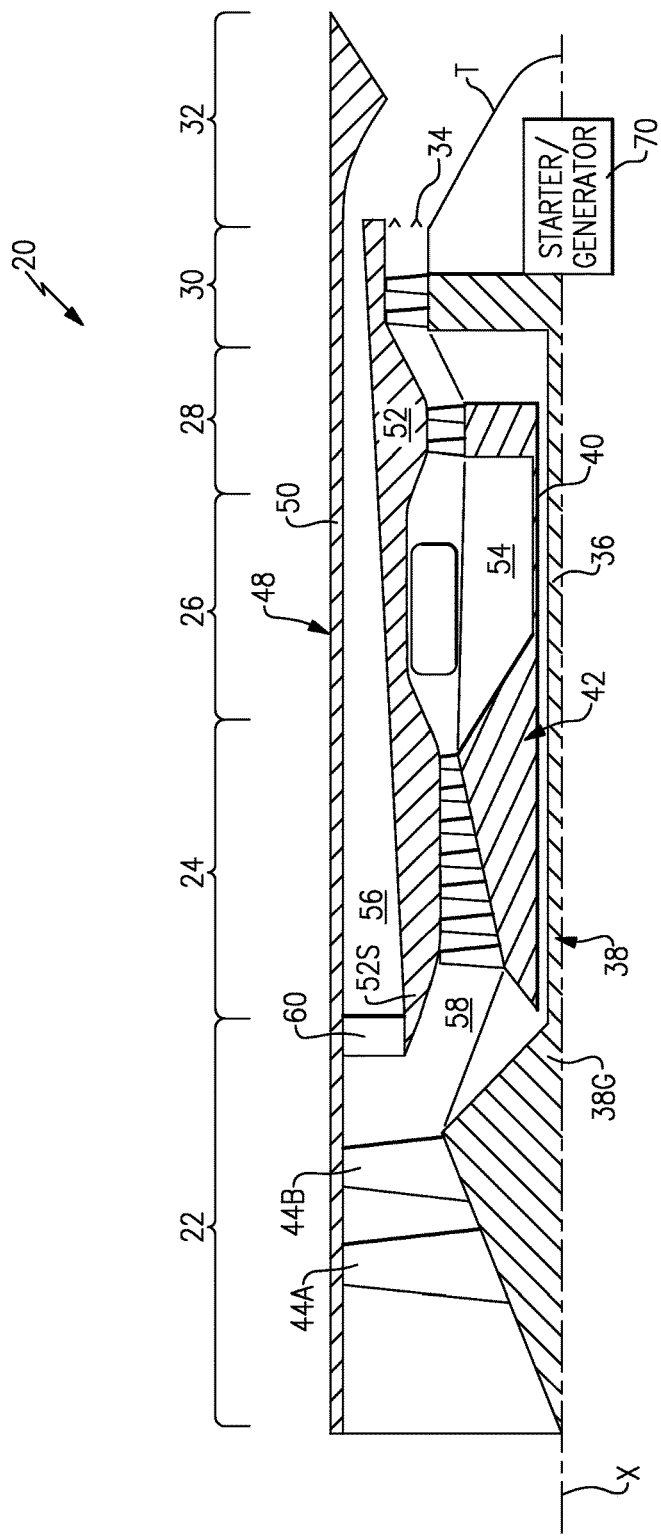
FIG. 1 is a general schematic view of an exemplary gas turbine engine with a low spool driven starter generator located within a tail cone according to one disclosed non-limiting embodiment.

FIG. 1 schematically illustrates a gas turbine engine 20. The gas turbine engine 20 is disclosed herein as a two-spool low bypass turbofan that generally includes a fan section 22, a high pressure compressor section (HPC) 24, a combustor section 26, a high pressure turbine section (HPT) 28, a low pressure turbine section (LPT) 30, and a nozzle section 32. Additional sections may include an augmentor section 34 among other systems or features such as a geared architecture. The sections are defined along a central longitudinal engine axis X.

The fan section 22 and the LPT 30 are coupled by a first shaft 36 to define a low spool 38. The HPC 24, the combustor section 26 and the HPT 28 are generally referred to as an engine core. The HPC 24 and the HPT 28 are coupled by a second shaft 40 to define a high spool 42. In the disclosed, non-limiting embodiment the low spool 38 and the high spool 42 counter-rotate about axis X.

The low spool 38 drives the fan section 22 either directly or through a geared architecture 38G (illustrated schematically) to drive a fan 44 such as a multi-stage fan with a first fan stage 44A and a second fan stage 44B, at a lower speed than the low spool 38. It should be appreciated that a low pressure compressor may alternatively or additionally be coupled to the first shaft 36 of the low spool 38.

An engine case structure 48 generally includes an outer case structure 50, an intermediate case structure 52 and an inner case structure 54. It should be understood that various structures individual or collectively within the engine may define the case structures 50, 52, 54 to essentially define an exoskeleton that supports the spools 38, 42 for rotation therein. The outer case structure 50 and the intermediate case structure 52 define a generally annular secondary flow path 56. The intermediate case structure 52 and the inner case structure 54 define a core flow path 58 radially within the secondary flow path 56.

A starter/generator 70, which, for example, may be in the Megawatt class for military weapon systems, or in the kilowatt class for civilian and military "all-electric" aircraft as well as others, is connected to the low spool 38. In one disclosed non-limiting embodiment, the starter/generator 70, is located aft of the LPT 30 within a tail cone T. Alternatively, the starter/generator 70, may be located within a fan hub 22H (FIG. 2) or connected forward of the low spool 38 through a forward power take off shaft 22S (FIG. 3) as well as in other locations.

Air which enters the fan section 22 is divided between a core airflow and a fan airflow. The core airflow passes through the HPC 24, the combustor section 26, the HPT 28, the LPT 30 then the augmentor section 34 where fuel may be selectively injected and burned to generate additional thrust through the nozzle section 32. The fan section 22 communicates the fan airflow into the secondary flow path 56 as well as the core flow path 58 as the fan 44 is upstream of a split 52S between the secondary flow path 56 and the core flow path 58. The fan airflow may be utilized for a multiple of purposes to include, for example, cooling, pressurization and VSTOL operations. The fan airflow passes through an annulus defined by the outer case structure 50 and the intermediate case structure 52 then may be at least partially injected into the core flow adjacent the nozzle section 32.

The nozzle section 32 receives flow from both the secondary flow path 56 and the core flow path 58. It should be understood that various fixed, variable, convergent/divergent, two-dimensional and three-dimensional nozzle systems as well as Variable Area Fan Nacelle (VAFN) may be utilized herewith.

The fan airflow as defined herein is any airflow different from the primary combustion gas core airflow through the engine core and may otherwise be described as secondary airflow or bypass air flow. Although depicted as an augmented low bypass gas turbine engine with a bypass ratio of approximately 0.7 in the disclosed non-limiting embodiment, it should be appreciated that the concepts described herein are applicable to other gas turbine engines such as high bypass engines with a VAFN.

The fan airflow is selectively communicated through a flow control mechanism 60 into the secondary flow path 56. The flow control mechanism 60 may include various structures such as rotationally variable splitter vanes, pneumatic or mechanical operated blocker doors, or other structures that operate as a choke point to define a variable area throat and selectively control flow into the secondary flow path 56 such that a selective percentage of flow from the fan section 22 is divided between the secondary flow path 56 and the core flow path 58.

Figure 4:
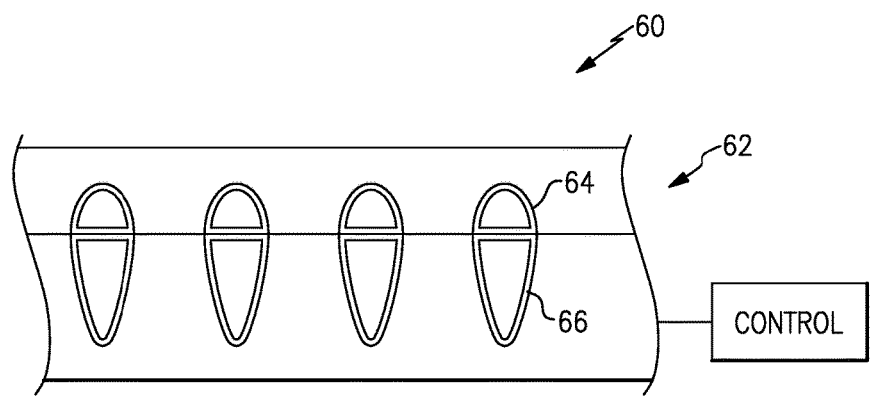
FIG. 4 is a flow control mechanism according to one disclosed non-limiting embodiment.
Figure 5:
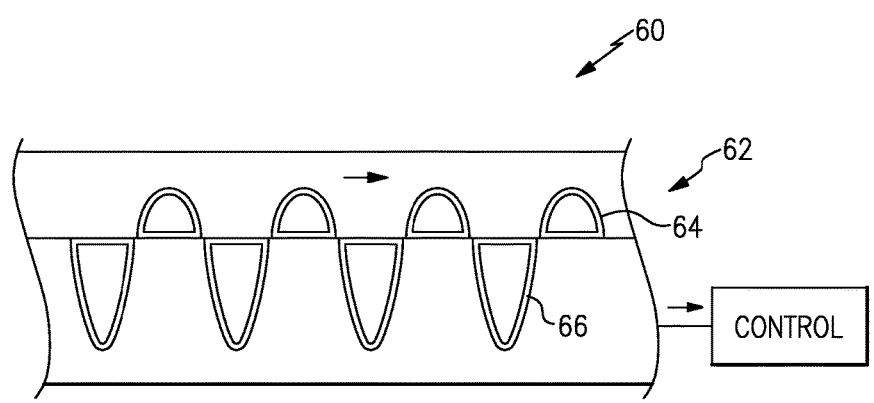
FIG. 5 is the flow control mechanism of FIG. 4 in a closed position according to one disclosed non-limiting embodiment.

With reference to FIG. 4, the flow control mechanism 60 in one, disclosed, non-limiting embodiment, is a fan duct blocker to divert flow from the secondary flow path 56. The fan duct blocker is a two-piece vane ring 62 with a static ring 64 and a movable ring 66 which is selectively rotatable relative to the static ring 64 (FIG. 5). During normal operation, the rings 64, 66 are in line to form an aerodynamic shape that causes little pressure drop in the secondary flow path 56. To redirect the fan airflow, the movable ring 66 is rotated such that the rings 64, 66 are staggered to form a wall to redirect a percentage of the fan airflow into the core flow path 58. It should be appreciated that all or a percentage of the fan airflow may be directed into the core flow path 58 through selective operation of the flow control mechanism 60.

Figure 6:
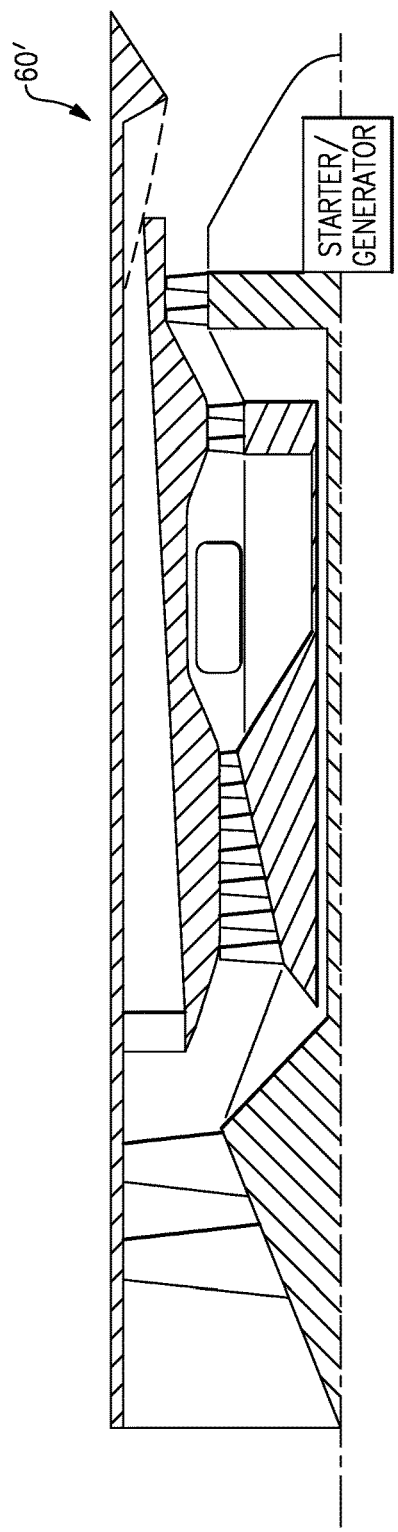
FIG. 6 is a flow control mechanism according to another disclosed non-limiting embodiment.

With reference to FIG. 6, another disclosed non-limiting embodiment of the flow control mechanism 60' is a Variable Area Fan Nozzle (VAFN) which is located at the aft end of the secondary flow path 56 in, for example, a high bypass engine architecture. Alternatively, or additionally, the nozzle section 32 may include a separate core nozzle 32C such as in a low bypass engine or variable cycle architecture.

Figure 7:
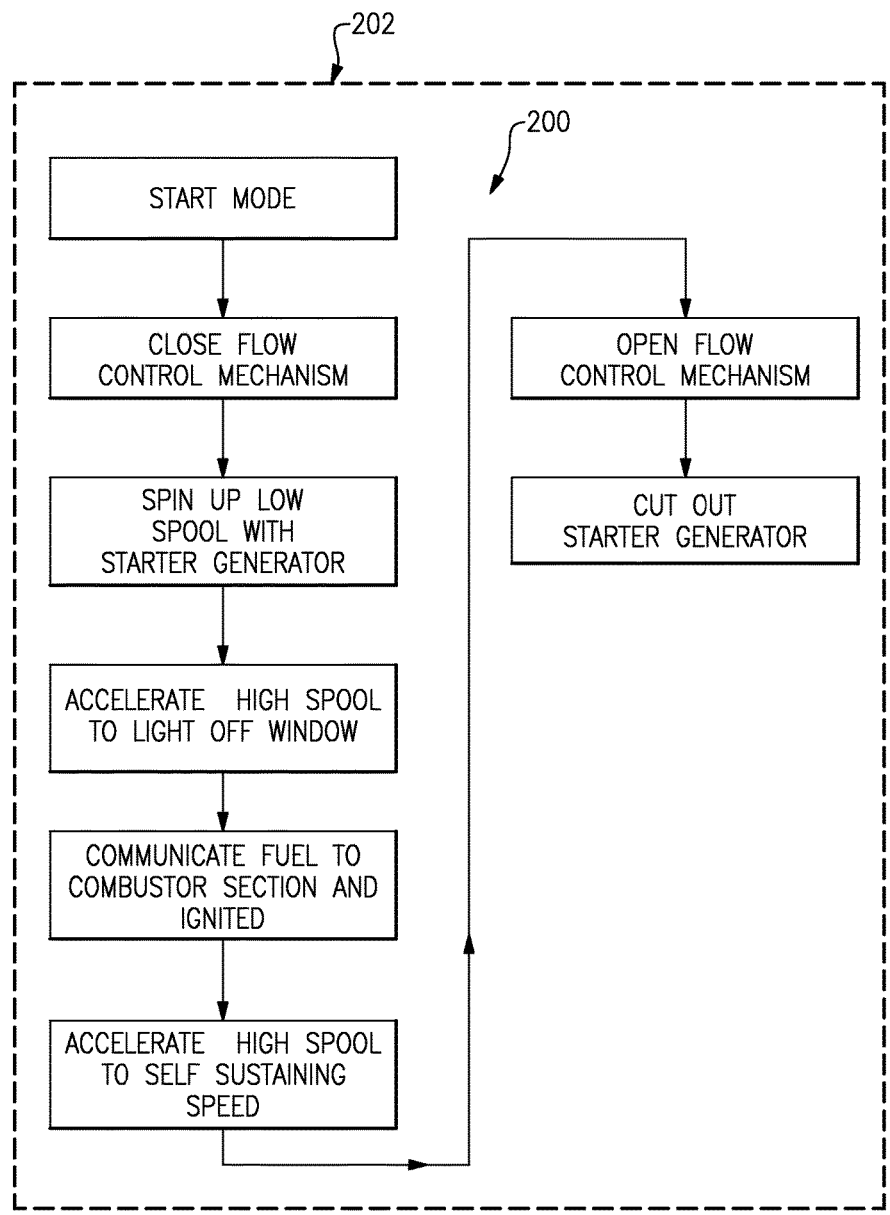
FIG. 7 is a flowchart illustrating a start mode operation.

With reference to FIG. 7, a logic diagram for a start mode algorithm 200 is schematically illustrated. The functions of the algorithm 200 are disclosed in terms of a block diagram. It should be understood by those skilled in the art with the benefit of this disclosure that these functions may be enacted in either dedicated hardware circuitry or programmed software routines capable of execution in a microprocessor based electronics control embodiment.

A module 202 may be utilized to execute the start mode algorithm 200. In one non-limiting embodiment, the module 202 may be an engine FADEC, a portion of a flight control computer, a portion of a central vehicle control, an interactive vehicle dynamics simulator unit or other system. The module typically includes a processor; a memory and an interface. The processor may be any type of known microprocessor having desired performance characteristics. The memory may be computer readable medium which stores the data and control algorithms described herein. The interface facilitates communication with the engine 20 as well as other avionics and vehicle systems.

Figure 8:
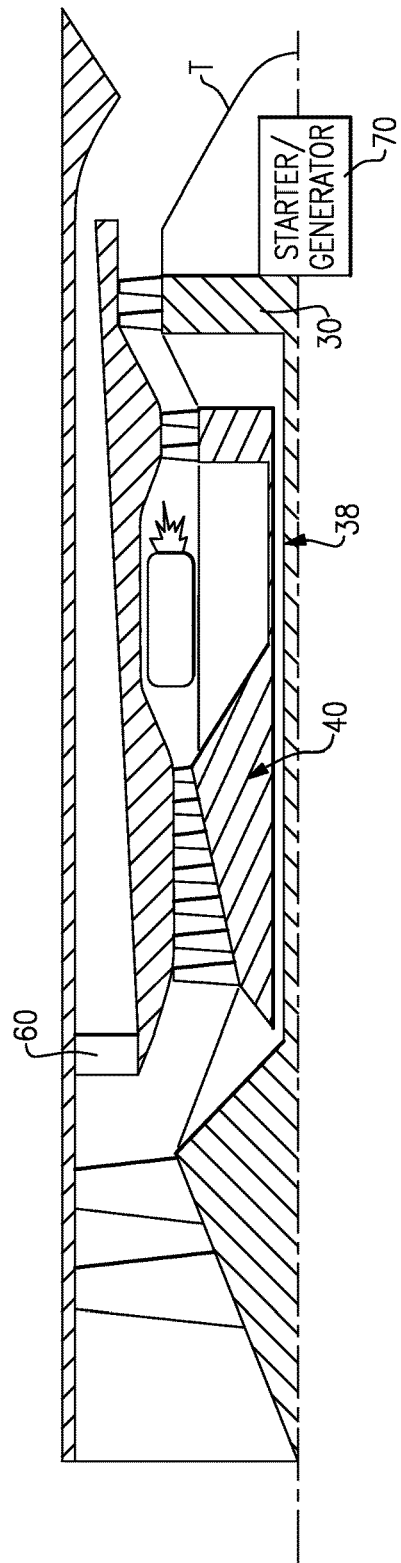
FIG. 8 is a general schematic view of the exemplary gas turbine engine of FIG. 1 in a flight operations mode.

With reference to FIG. 8, in a flight mode, the flow control mechanism 60 is open to communicate fan airflow into the secondary flow path 56 and the starter/generator 70 operates in generate mode. That is, when the flow control mechanism 60 is open, the fan airflow is communicated through the secondary flow path 56 and the core flow path 58 to generate thrust along axis A.

Figure 9:
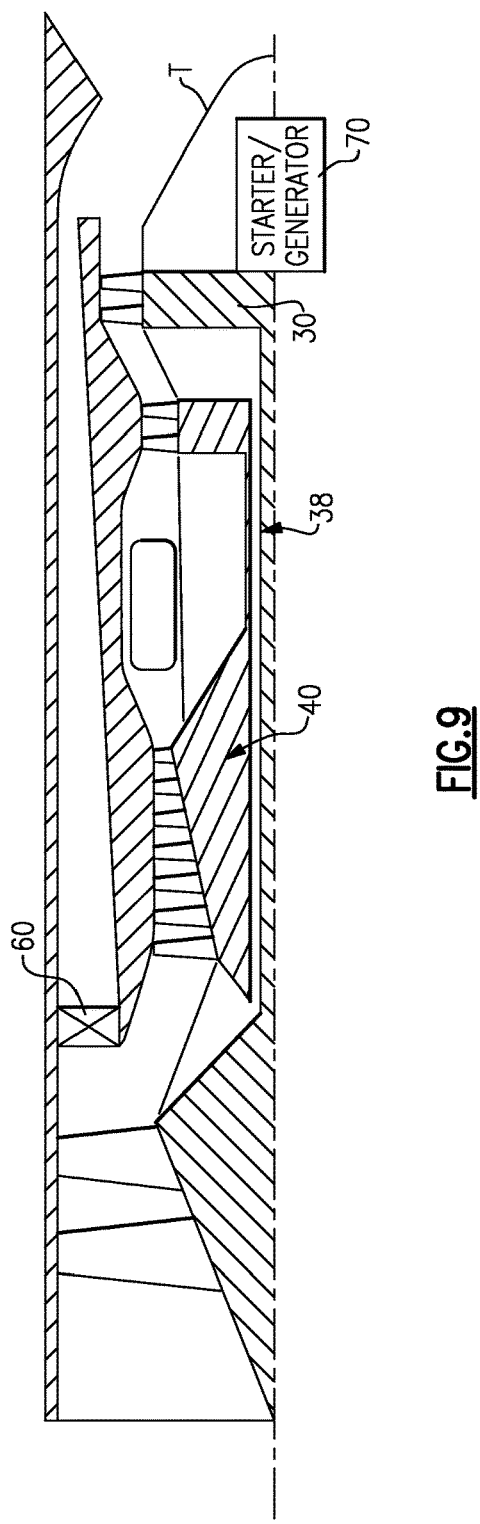
FIG. 9 is a general schematic view of the exemplary gas turbine engine of FIG. 1 in a start mode.

With reference to FIG. 9, the starter/generator 70 operates in starter mode and the flow control mechanism 60 is closed to start the engine 20. The starter/generator 70 spins up the low spool 38 and the flow control mechanism 60 directs a percentage of the fan airflow into the core flow path 58 to drive the HPT 28 and spin up the high spool 42.

With the flow control mechanism 60 closed, approximately two-times (2×) or other multiple of the torque is provided to the high spool 42 from the fan airflow which reduces the work required to spin the high spool 42. This essentially simulates an in-air windmill restart as the flow through the core drives the HPT 28 to thereby drive the HPC 24 and pressurize the core flow.

The flow control mechanism 60 directs the fan airflow to accelerate the high spool 42 to a defined light off window to await ignition. When the proper high spool 42 air flow (driven by fuel air ratio) and high spool 42 mechanical speed (driven by stability requirements) reach the defined light-off window, fuel is communicated to the combustor section 26 and ignited. The high spool 42 is then accelerated to a self-sustaining speed.

The flow control mechanism 60 may remain closed until the high spool 42 reaches the self-sustaining speed and generates enough torque to continue independent acceleration. Once this occurs, the flow control mechanism 60 is opened and the starter/generator 70 is shifted into generate mode.

As the low spool 38 has a substantially larger inertia than the high spool 42, the engine 20 may be more tolerant to power extraction. This architecture obviates the need for a starter/generator on the high spool 42 and enables a completely extraction-less high spool 42, which reduces the required surge margin. Hence, the HPC 24 can be designed more aggressively as the high spool 42 need not be designed with extra surge margin to accommodate power extraction associated with an attached motor/generator, to facilitate a more efficient design and potentially fewer stages. This will positively affect Thrust Specific Fuel Consumption (TSFC) and reduce overall engine weight.

Figure 10:
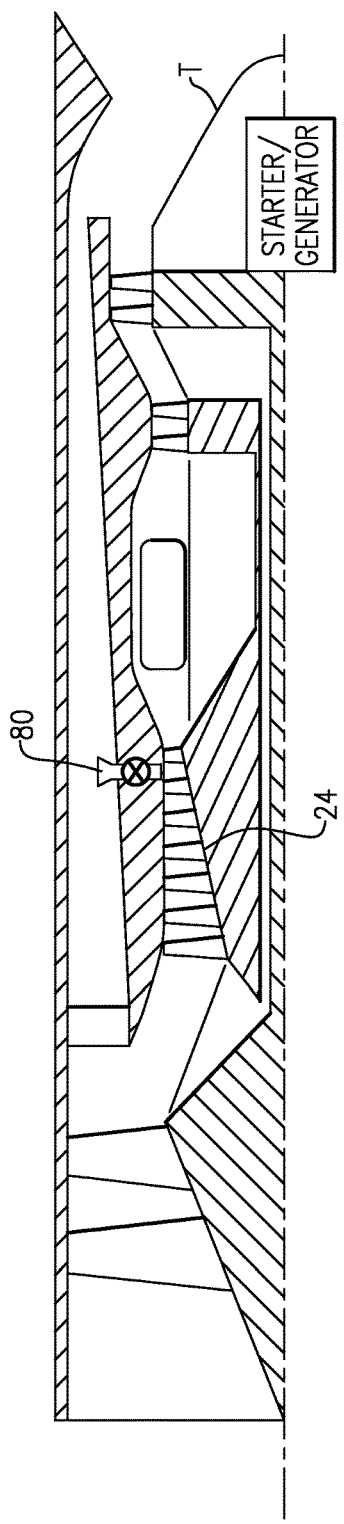
FIG. 10 is a general schematic view of the exemplary gas turbine engine of FIG. 1 with a start bleed.

With reference to FIG. 10 a start bleed 80 is in communication with the HPC 24 in another disclosed non-limiting embodiment. The start bleed 80 may be located between rotor blade rows and is selectively opened to the secondary flow path 56 in the start mode to facilitate control of the HPC 24 stability during the start mode as the fan section 22 is operating in an off design condition. In this disclosed non-limiting embodiment, the start bleed 80 is in communication with the last stage of the HPC 24, however the start bleed 80 may be located at other stages in the HPC 24.

Figure 11:
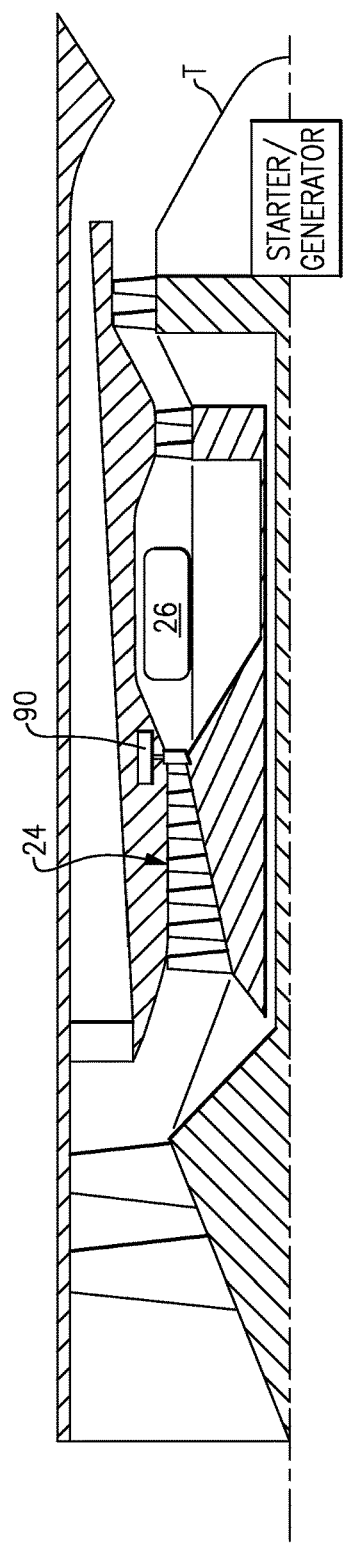
FIG. 11 is a general schematic view of the exemplary gas turbine engine of FIG. 1 with a HPC variable guide vane.

With reference to FIG. 11, the HPC 24 includes a variable exit guide vanes 90. In this disclosed non-limiting embodiment, the variable exit guide vanes 90 is in the last stage of the HPC 24 immediately upstream of the combustor section 26, however, the variable exit guide vanes 90 may alternatively or additionally be located in other stages of the HPC 24 as well as other upstream compressor and fan sections. During the start mode, airflow is selectively metered by the variable exit guide vanes 90 through, for example, an approximately plus/minus twenty (20) degree rotation of the variable exit guide vanes 90 in which the variable exit guide vanes 90 are essentially more open to increase airflow through the core and torque application to the high spool 42.

Figure 12:
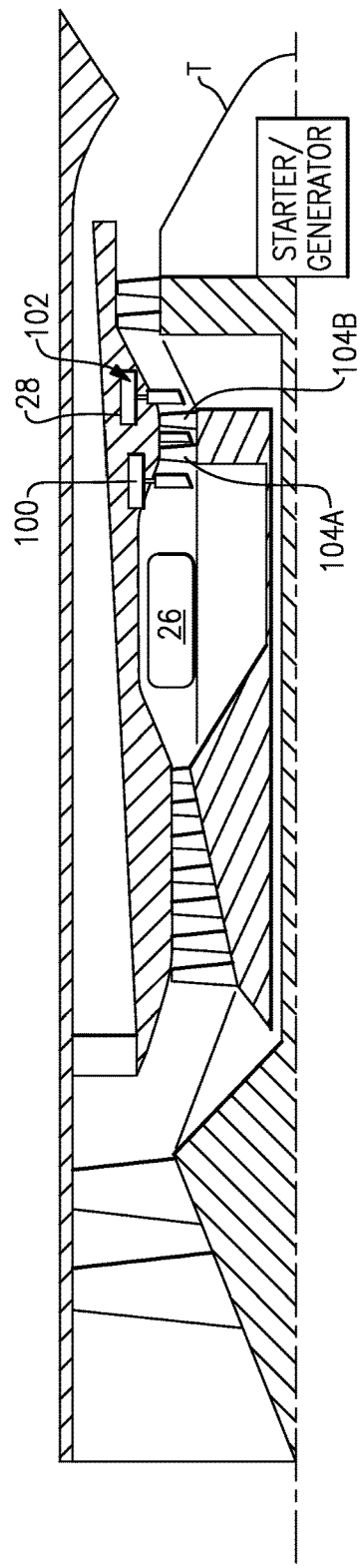
FIG. 12 is a general schematic view of the exemplary gas turbine engine of FIG. 1 with a HPT variable guide vane.

With reference to FIG. 12, the HPT 28 includes variable inlet guide vanes 100 and/or variable exit guide vanes 102 in another disclosed non-limiting embodiment. That is, the variable turbine vanes 100, 102 may be at either or both the entrance and the exit of the HPT 28. It should be appreciated that additional or alternative HPT 28 stages may include variable vanes which may be opened through, for example, an approximately plus/minus twenty (20) degree rotation.

The variable turbine vanes 100, 102 facilitate low spool start modes as—like the variable EGV on the HPC 24—they are modulated to increase airflow during start modes. The variable turbine vanes 100, 102 also may be utilized to change the incidence angle of the flow on the turbine blades 104A, 104B (of the illuminated two stage HPT) to provide for more efficient operation at this off-design condition. That is, the HPT 28 would generate more torque and therefore accelerate the HPC 24 more rapidly for the same airflow.

Figure 13:
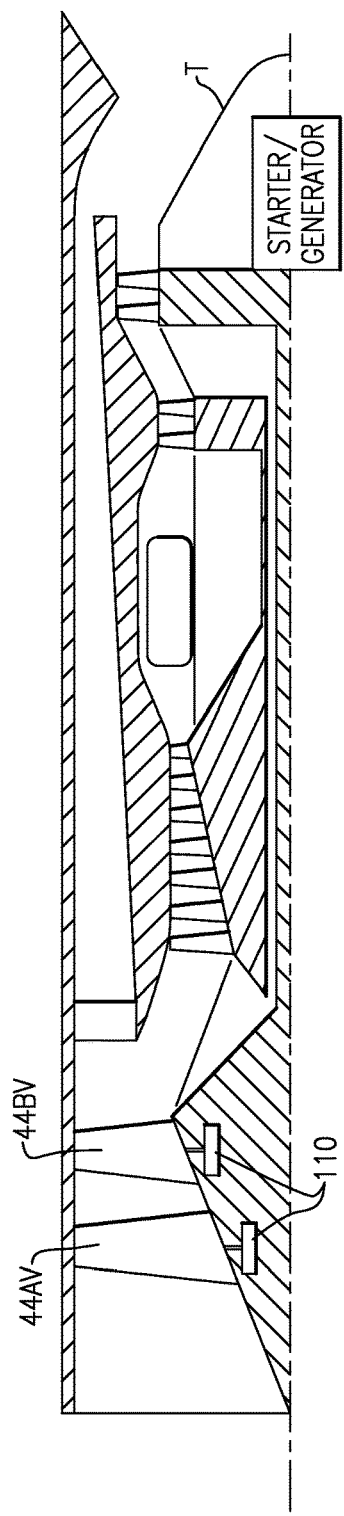
FIG. 13 is a general schematic view of the exemplary gas turbine engine of FIG. 1 with a variable pitch fan blade.

With reference to FIG. 13, the fan section 22 includes a variable pitch first fan stage 44AV and/or a variable pitch second fan stage 44BV in another disclosed non-limiting embodiment. The variable pitch first fan stage 44AV and/or the variable pitch second fan stage 44BV are driven independently or simultaneously via a variable pitch mechanism 110 to selectively change the pitch thereof. The respective variable pitch mechanism 110 is operable to change fan blade pitch in a manner typical of, for example, a turboprop system, however, variable pitch mechanisms 110 of various types may be utilized.

In the start mode, the fan section 22 operates at an off-design condition, and may be relatively inefficient such that a selective change in pitch via the variable pitch mechanism 110 adjusts the fan section 22 to increase airflow for same start torque.

Figure 14:
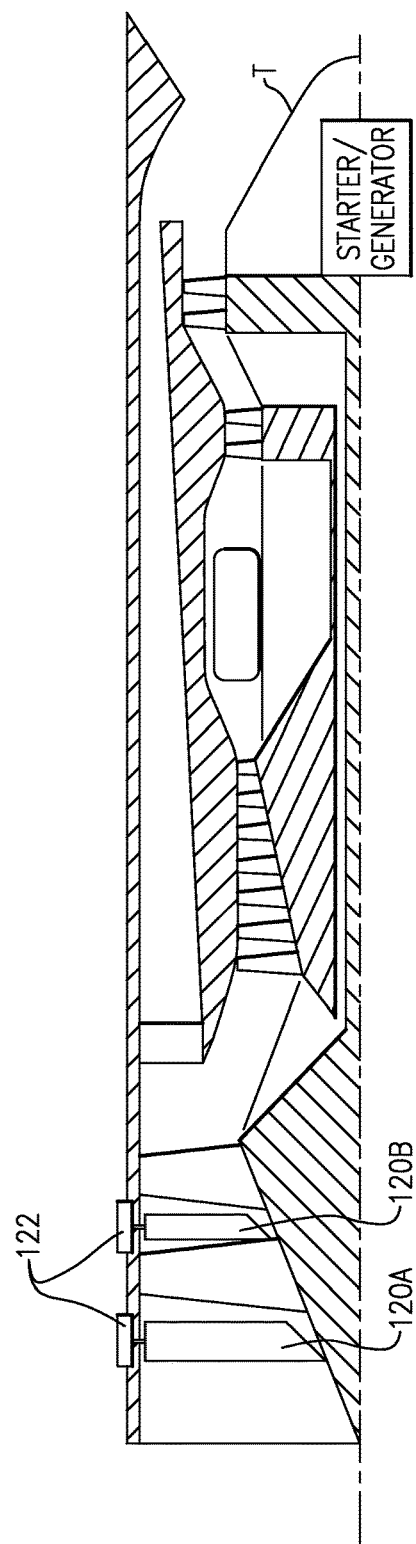
FIG. 14 is a general schematic view of the exemplary gas turbine engine of FIG. 1 with a variable pitch fan section.

With reference to FIG. 14, the fan section 22 alternatively or additionally includes a variable inlet guide vanes 120A and/or interstage guide vanes 120B in another disclosed non-limiting embodiment. The variable inlet guide vanes 120A and/or the interstage guide vanes 120B are selective changed in pitch by a variable pitch mechanism 122 to adjust the fan section 22 to increase airflow in the start mode. It should be understood that variable inlet guide vanes 120A and/or the interstage guide vanes 120B may be utilized in combination with the variable pitch first fan stage 44AV and/or the variable pitch second fan stage 44BV as well as other fan stage architectures.

Figure 15:
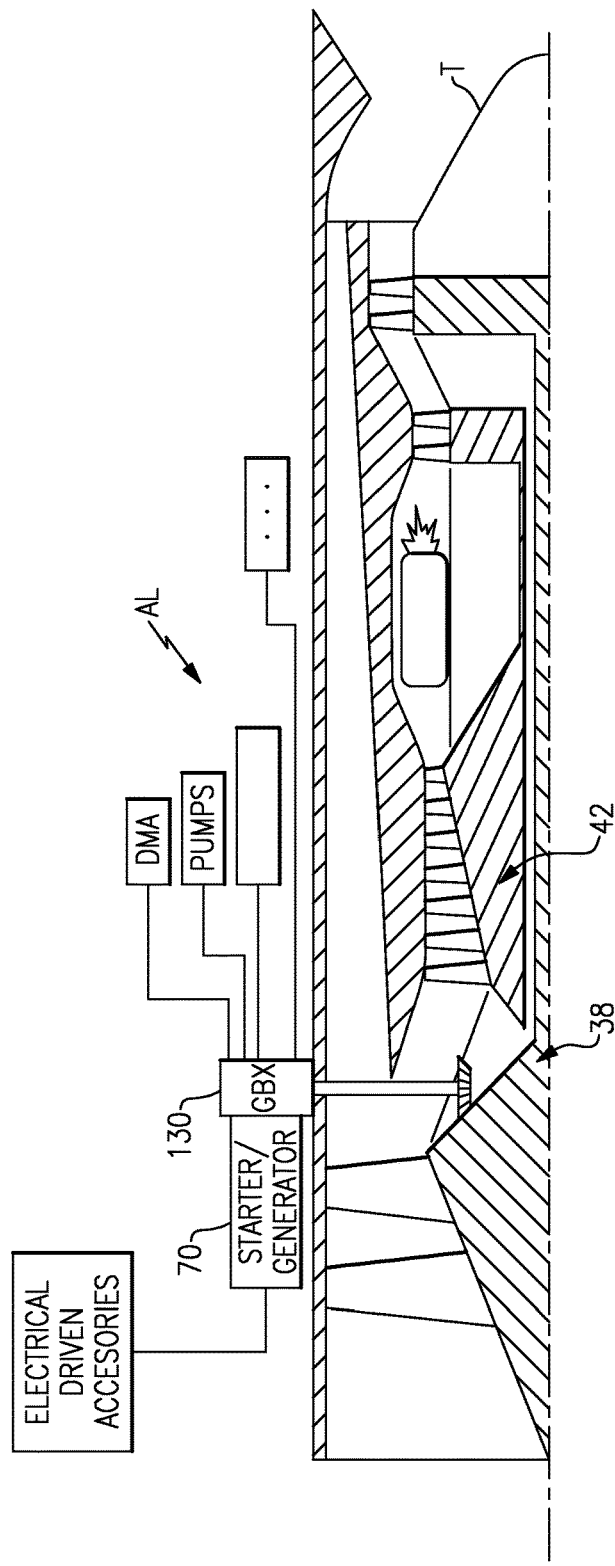
FIG. 15 is a general schematic view of an exemplary gas turbine engine with a low spool driven starter generator driven by a towershaft and an all-electric accessories according to another disclosed non-limiting embodiment.

With reference to FIG. 15, the elimination of the starter/generator on the high spool 42 also facilitates packaging. In the disclosed non-limiting embodiments, no high spool gearbox is utilized and all of the engine accessories AC such as the PMA, the fuel pumps, the oil pumps, etc. are either driven electrically in an all-electric type aircraft.

Alternatively, or in addition, a towershaft-driven constant speed transmission 130 mechanically driven by the low spool 38. That is, no power extraction need be obtained from the high spool 42. The constant speed transmission 130 is driven by the low spool 38 such that the speed varies linearly with the speed of the low spool 38 which may operate at speed excursions of up to 80% between idle to max take-off conditions. The constant speed transmission accessory gearbox 130 maintains constant output speed despite speed excursions of the low spool 38. That is, the constant speed transmission 130 provides, for example, a 5:1 continuously variable gear ratio capability which automatically selects the most optimum gear ratio to maintain the constant output speed in response to the low spool 38 speed excursions.

It should be understood that relative positional terms such as "forward," "aft," "upper," "lower," "above," "below," and the like are with reference to the normal operational attitude of the vehicle and should not be considered otherwise limiting.

It should also be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a high spool along an engine axis, said high spool operable to communicate a core airflow through a core flow path;
   a fan section operable to communicate a fan airflow into a secondary flow path and said core flow path;
   a low spool along said engine axis to drive said fan section;
   a starter/generator connected to said low spool, said starter/generator having a start mode in which the starter/generator rotationally drives said low spool and a generate mode in which said low spool drives said starter/generator to produce electric power;
   a flow control mechanism operable to direct at least a portion of said fan airflow from said secondary flow path into said core flow path, said flow control mechanism including a static ring and a moveable ring relative to said static ring, said static ring including a plurality of first circumferentially-spaced portions in said secondary flow path and said moveable ring including a corresponding plurality of second circumferentially-spaced portions in said secondary flow path, said static ring and said moveable ring having an aligned position and a staggered position with respect to one another, wherein in said aligned position each of said first circumferentially-spaced portions and each of said corresponding second circumferentially-spaced portions form an aerodynamic shape and in said staggered position each of said first circumferentially-spaced portions is circumferentially offset from each of said corresponding second circumferentially-spaced portions; and
   a controller configured with an engine starter mode and an engine flight mode, wherein responsive to said engine starter mode said static ring and said moveable ring are in said staggered position blocking said secondary flow path and said starter/generator is in said start mode, and responsive to changing from said engine starter mode to said engine flight mode said controller changes said static ring and said moveable ring to be in said aligned position opening said secondary flow path and changes said starter/generator to be in said generate mode.

2. The gas turbine engine as recited in claim 1, wherein said starter/generator is forward of said low spool.

3. The gas turbine engine as recited in claim 1, wherein said starter/generator is aft of said low spool.

4. The gas turbine engine as recited in claim 1, wherein said starter/generator is driven by said low spool through a towershaft.

5. The gas turbine engine as recited in claim 1, wherein said high spool along said engine axis with a high pressure compressor section and a high pressure turbine section, said high pressure compressor section includes a variable guide vane.

6. The gas turbine engine as recited in claim 1, wherein said high spool along said engine axis with a high pressure compressor section and a high pressure turbine section, said high pressure turbine section includes a variable guide vane.

7. The gas turbine engine as recited in claim 1, wherein said fan section includes a variable pitch fan blade.

8. The gas turbine engine as recited in claim 1, wherein said fan section includes a variable pitch vane.

9. The gas turbine engine as recited in claim 1, wherein said high spool along said engine axis with a high pressure compressor section and a high pressure turbine section, a start bleed in selective communication with said high pressure compressor section.

10. The gas turbine engine as recited in claim 1, wherein said low spool drives said fan section through a geared architecture.

11. A method of operating a gas turbine engine comprising:
    driving a low spool to generate a fan airflow from a fan section connected to the low spool; and
    modulating a flow control mechanism and a starter/generator according to an engine starter mode and an engine flight mode to selectively direct at least a portion of the fan airflow from a secondary flow path into a core flow path to drive a high spool, wherein the starter/generator is connected to the low spool, the starter/generator having a start mode in which the starter/generator rotationally drives the low spool and a generate mode in which the low spool drives the starter/generator to produce electric power,
    the flow control mechanism including a static ring and a moveable ring relative to the static ring, the static ring including a plurality of first circumferentially-spaced portions in the secondary flow path and the moveable ring including a corresponding plurality of second circumferentially-spaced portions in the secondary flow path, the static ring and the moveable ring having an aligned position and a staggered position with respect to one another, wherein in the aligned position each of the first circumferentially-spaced portions and each of the corresponding second circumferentially-spaced portions form an aerodynamic shape and in the staggered position each of the first circumferentially-spaced portions is circumferentially offset from each of the corresponding second circumferentially-spaced portions, and wherein the modulating includes, the static ring and the moveable ring being in the staggered position blocking the secondary flow path and the starter/generator being in the start mode responsive to the engine starter mode, and responsive to changing from the engine starter mode to the engine flight mode the static ring and the moveable ring move to the aligned position and the starter/generator changes to the generate mode.

12. The method as recited in claim 11, wherein no accessory gearbox is driven by the high spool.

13. The method as recited in claim 11, further comprising: rotating the high spool in a direction opposite that of the low spool.

14. The method as recited in claim 11, further comprising: driving the fan section through a geared architecture driven by the low spool.

15. The method as recited in claim 11, further comprising: driving a constant speed transmission with the low spool.

16. The gas turbine engine as recited in claim 1, wherein in said staggered position, said plurality of first circumferentially-spaced portions and said plurality of second circumferentially-spaced portions fully block said secondary flow path.

17. The gas turbine engine as recited in claim 1, wherein in said staggered position, said plurality of first circumferentially-spaced portions and said plurality of second circumferentially-spaced portions partially block said secondary flow path.

18. The gas turbine engine as recited in claim 1, further comprising a nozzle section circumscribing exits of, respectively, said core flow path and said secondary flow path, wherein said nozzle section is a convergent/divergent nozzle.

19. The gas turbine engine as recited in claim 1, wherein, responsive to said engine starter mode, said controller is configured to move said moveable ring from said aligned position to said staggered position blocking said secondary flow path such that said fan airflow is communicated into said coreflow path to drive said high spool, followed by activating said starter/generator to accelerate said low spool.

20. The gas turbine engine as recited in claim 19, wherein, after a self-sustaining speed of said high spool is achieved, said controller is configured to move said moveable ring from said staggered position to said aligned position opening said secondary flow path such that said fan airflow is communicated into said secondary flow path, followed by changing said starter/generator from said start mode to said generate mode.

* * * * *